(12) United States Patent
Windover

(10) Patent No.: US 7,092,641 B2
(45) Date of Patent: Aug. 15, 2006

(54) METHOD AND APPARATUS FOR OPTICAL TRANSMISSION OF WAVELENGTH-ENCODED MODULATION FORMATS

(75) Inventor: Lisa A. Windover, San Francisco, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 683 days.

(21) Appl. No.: 10/159,493

(22) Filed: May 31, 2002

(65) Prior Publication Data
US 2004/0208645 A1    Oct. 21, 2004

(51) Int. Cl.
*H04B 10/04* (2006.01)

(52) U.S. Cl. .............. 398/186; 398/140; 398/141; 398/182; 398/183; 398/187; 398/189; 398/190; 398/191; 398/192; 398/193; 398/194; 398/202; 398/213; 398/214; 398/147; 398/158; 398/159; 398/154; 398/155; 372/8; 372/83; 372/87

(58) Field of Classification Search ............... 398/202, 398/141, 154, 155, 186, 187, 213, 214, 140, 398/182, 147, 158, 159, 183, 189, 190, 191, 398/192, 193, 194; 372/8, 83, 87
See application file for complete search history.

(56) References Cited

U.S. PATENT DOCUMENTS

| | | | |
|---|---|---|---|
| 5,243,608 A * | 9/1993 | Chawki et al. ............... 372/8 |
| 5,541,756 A | 7/1996 | Chang-Hasnain et al. | |
| 5,760,419 A | 6/1998 | Nabiev et al. | |
| 5,995,253 A * | 11/1999 | Flaherty ...................... 398/36 |
| 6,304,357 B1 * | 10/2001 | Ohhata et al. ............. 398/209 |

* cited by examiner

*Primary Examiner*—Hanh Phan

(57) ABSTRACT

A system that transmits amplitude modulated data in a wavelength-encoded format and then uses a wavelength-sensitive receiver to convert the received optical signal back to the original amplitude modulated data. This system enables transmission of optical signals that are less sensitive to attenuation and attenuation changes. This system is applicable to data in digital, multilevel, or analog formats.

23 Claims, 4 Drawing Sheets

METHOD AND APPARATUS FOR OPTICAL TRANSMISSION OF WAVELENGTH-ENCODED MODULATION FORMATS

BACKGROUND OF THE INVENTION

1. Field of the Invention

The present invention relates generally to fiber optic modulation and coding methods and more particularly it relates to a wavelength-sensitive receiver for converting wavelength changes to amplitude changes in an optical transmission system which uses a wavelength-encoded modulation format.

2. Background of the Invention

Fiber optic systems typically use amplitude modulation (AM) to encode data on an optical carrier signal. In this encoding method, the amplitude of the carrier waveform is modified according to the information signal that it is transporting. The receiver simply detects the intensity of the light that hits the photodetector and then uses a decision circuit to decode the signal back to the digital data (in the case of digital modulation). Any fiber optic system will have attenuation due to the losses of splices and connectors, and within the optical fiber itself. Due to these losses, a fiber optic receiver must be able to tolerate amplitude variations in the fiber optic link. This is the dynamic range of the receiver.

Another way to encode digital data on a fiber optic link is to code a "0" bit on one frequency and a "1" bit on another frequency. This binary format is referred to as frequency-shift keying. However, since this is the optical domain this could also be referred to as the wavelength-shift keying where the subcarrier wavelength determines the logical state. By encoding the data in the wavelength rather than in the intensity of the light, the sensitivity of the fiber optic link to attenuation is reduced. The receiver must be able to detect changes in wavelength rather than changes in intensity to decode the information and prevent contamination of the optical signal due to light intensity losses.

One problem with the use of wavelength-shift keying is that photodetectors, which are used to convert optical signals to an electrical output, respond to the intensity of light independent of wavelength.

SUMMARY OF THE INVENTION

It is a primary purpose of the present invention to facilitate wavelength-shift keying among modulation formats, by use of a wavelength-sensitive receiver which converts wavelength changes to amplitude changes. This is accomplished in one embodiment of the invention by employing a fiber optic receiver for a link that has the information coded in the wavelength domain. In order to convert the wavelength information, a photodetector in the wavelength-sensitive receiver is preceded by a device such as a Fabry-Perot (FP) filter that has a transmission function with the appropriate shape for the wavelengths of interest. Due to the reflective properties of the cavity within the FP filter, the optical transmission through the filter will have variations in intensity versus input wavelength. Since these properties can be predicted, the transmission output of the FP filter can be designed to yield a certain intensity at the "0" bit wavelength, for example, and another intensity at the "1" bit wavelength. After passing through the FP filter, the light intensity is detected using a conventional photodetector that then converts the light to an electrical signal to be used by a decision circuit or for any other appropriate purpose. In one embodiment the combination of a photodetector preceded by a FP filter is the wavelength-sensitive receiver.

BRIEF DESCRIPTION OF THE DRAWING

The objects, advantages and features of the present invention will become more apparent to those skilled in the art from the following detailed description, when read in conjunction with the accompanying drawing, wherein.

DETAILED DESCRIPTION OF THE PREFERRED EMBODIMENTS

The present invention provides, in several embodiments, a method and an apparatus for converting optical wavelength changes to intensity changes in a fiber optic receiver for a link that has the information coded in the wavelength domain. An example of information coded in the wavelength domain is a binary format where a "0" bit is transmitted on one wavelength and a "1" bit is transmitted on another wavelength. A receiver comprises a wavelength-sensitive element such as a FP filter and a photodetector in order to decode the "zeros" and "ones." The wavelength-sensitive element may be realized by using a FP filter. The optical transmission through the FP filter will have variations in intensity versus input wavelength. An exemplary FP filter is illustrated in FIG. 3 and is detailed herein below.

Figure 1:
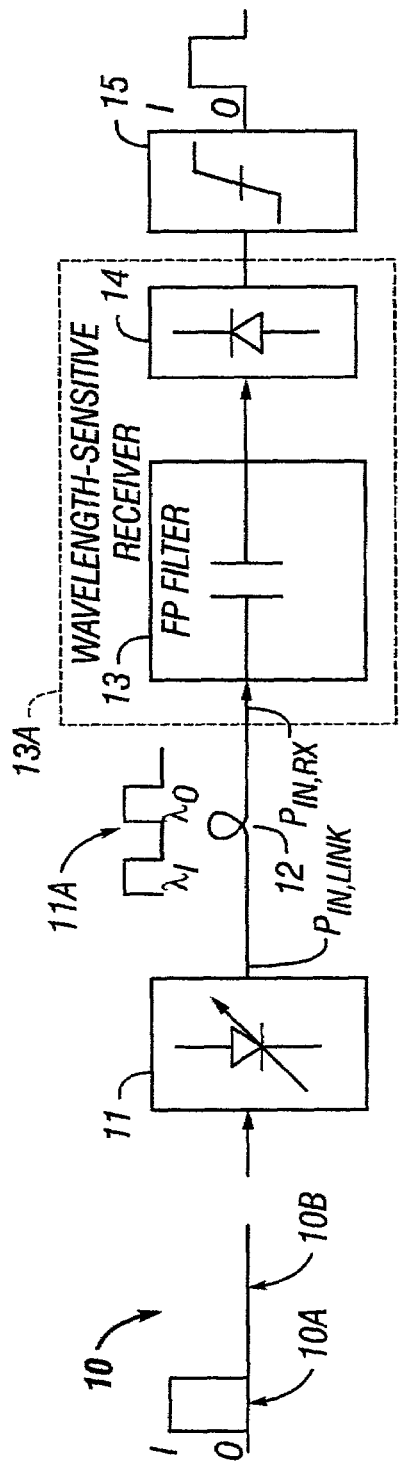
FIG. 1 schematically shows the functional elements of an exemplary fiber optic data system, with signal representations, embodying the present invention.
Figure 2:
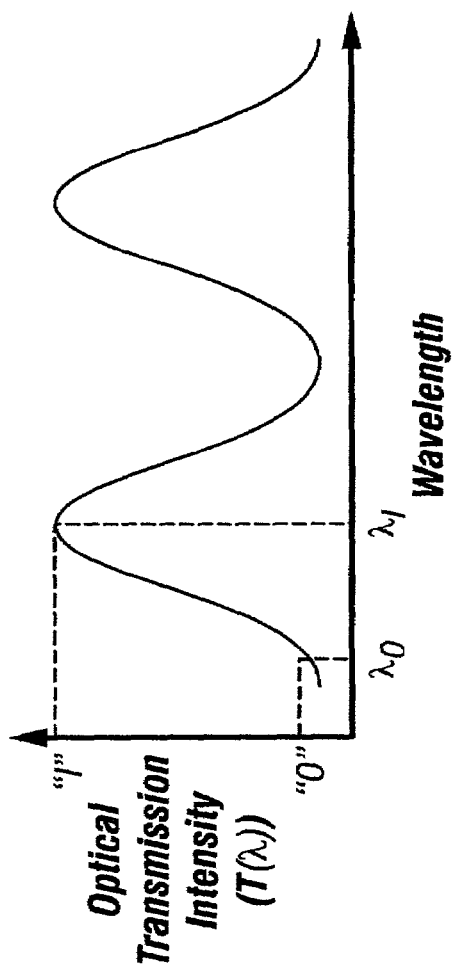
FIG. 2 shows an exemplary waveform as the transmission characteristics of a particular FP filter.

FIG. 1 illustrates a binary signal that is encoded, converted and decoded according to the invention. At its input, tunable laser 11 maps digital input 10 to corresponding wavelengths 11A. In this example, there is a digital "1" pulse at bit location 10A and a digital zero "pulse" at bit location 10B. These are converted to respective wavelengths $\lambda_1$ and $\lambda_0$ (11A) by tunable laser 11. The signal travels through fiber optic cable or link 12 where any attenuation losses do not affect the wavelength-encoded data. The signal reaches wavelength-sensitive receiver 13A which, in this embodiment, comprises FP filter 13 and photodetector 14. Light exiting the FP filter has two intensities corresponding to $\lambda_0$ and $\lambda_1$ as shown by the graph of FIG. 2. Photodetector 14 then converts the optical signal to an electrical output based on its intensity. Decision circuit 15 is employed to decode and recover the digital data. It may comprise, for example, a continuously acting voltage comparator and a clocked flip-flop or a sample-and-hold circuit. The actual means for realizing this circuit is well within the skill of those in this technical field and need not be detailed here. If the received voltage from the photodetector is below a predetermined threshold, the decision circuit produces a "0" bit at its output. Alternatively, if the voltage exceeds the threshold, a "1" bit is produced.

Figure 3:
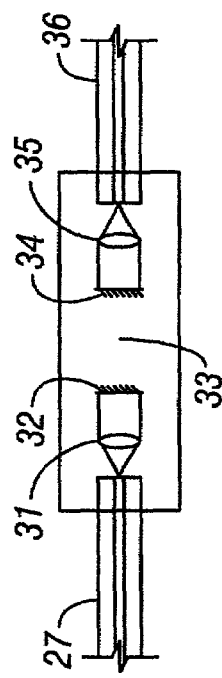
FIG. 3 is an exemplary FP filter that may be employed in an embodiment of the invention.

A Fabry-Perot filter is a known device that consists of a cavity formed by two partially transmitting mirrors placed in parallel with each other, as shown in FIG. 3. It may be more specifically referred to as a Fabry-Perot interferometer (FPI) or FP etalon. A simple FP filter typically consists of two mirrors and a precisely fixed air gap. Incident light enters the FP cavity 33 through optical fiber 27 and collimating lens 31. Once inside the cavity, the light beam undergoes multiple reflections between mirrors 32 and 34 so that it can interfere with itself many times. Eventually some of the light is transmitted out of the other end of the cavity through focusing lens 35 and optical fiber 36, for example. There are certain wavelengths of light that become stronger while undergoing multiple reflections due to constructive interference. Other wavelengths will experience destructive interference. The end result can be illustrated as a plot of optical transmission intensity through the cavity vs. wavelength that has multiple peaks and valleys (see FIGS. 2, 4B and 5B). The FP filter performance is exhibited by the sharpness and separation of the peaks. That waveform is determined by the air gap, mirror separation and reflectivity, as is known to those skilled in the art. A critical aspect of this invention is that certain wavelengths of light can be converted to particular amplitudes using the combination of a FP filter and a photodetector. The FP filter behavior can be predicted using known design parameters such as mirror separation and reflectivity. Thus the FP characteristics are selectable for the purpose at hand.

Figure 4A:
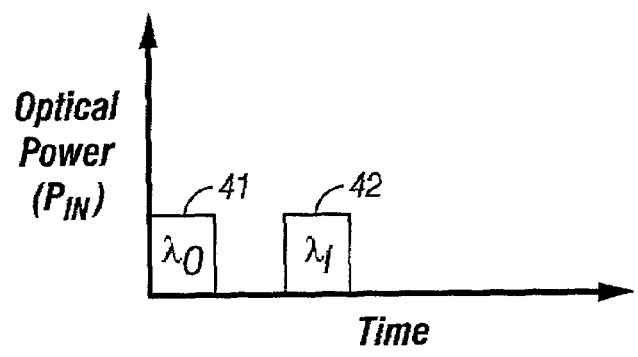
FIGS. 4A through 4D show signals at different locations in the FIG. 1 embodiment.
Figure 4B:
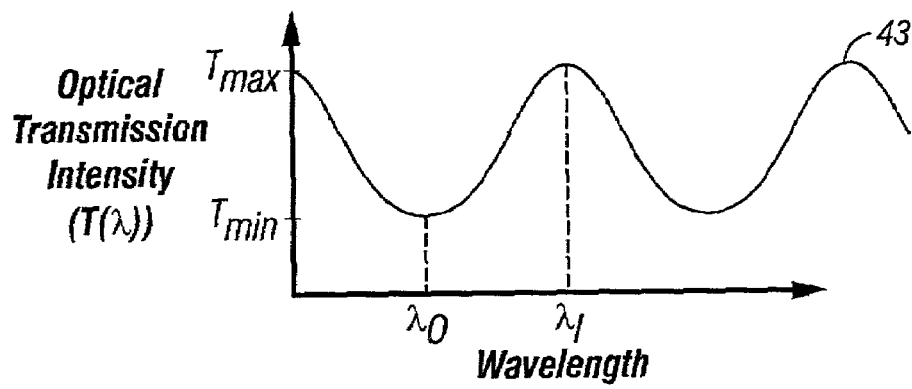
Figure 5A:
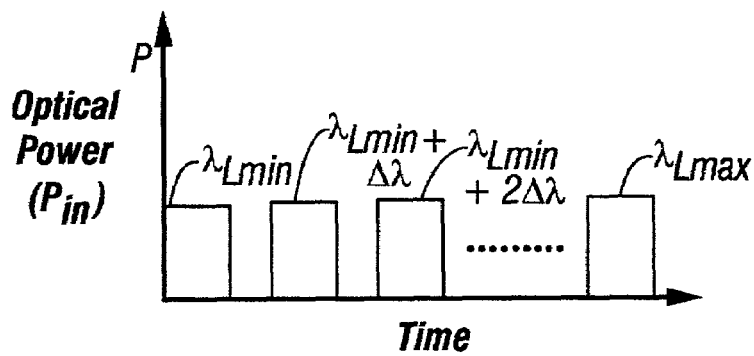
FIGS. 5A through 5D are representative graphs similar to FIGS. 4A through 4D, demonstrating use of the invention for converting multiple wavelengths to multiple intensities.
Figure 5B:
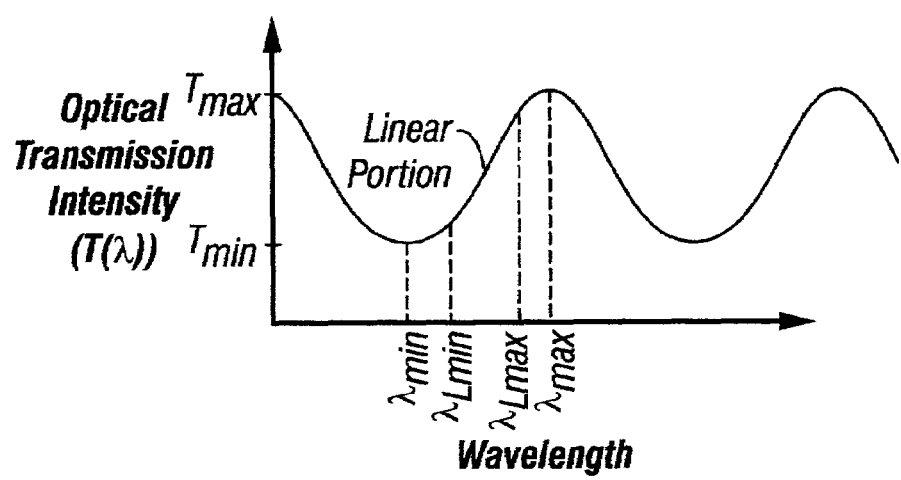

FIGS. 2, 4B and 5B display a plot of the transmission intensity vs. input wavelength for a particular filter. FIGS. 2 and 4B also display how the plot may be used for binary operation. For use in the invention, the minimum and maximum wavelengths are chosen as the carrier wavelengths of the signals ($\lambda_0$ and $\lambda_1$). The FP filter may be custom designed to have a minimum at the "0" bit wavelength ($\lambda_0$) and a maximum at the "1" bit wavelength ($\lambda_1$).

FIGS. 4A through 4D provide waveform details of the FIG. 1 embodiment. Specifically in the example, a signal from laser 11 has an initial input power $P_{IN, LINK}$ and is transmitted in two pulses, 41 and 42 respectively, on one of two wavelengths ($\lambda_0$ and $\lambda_1$) as in FIG. 4A. A return-to-zero (RZ) data format is shown where an inactive period follows each signal. It is additionally contemplated that a non-return-to-zero (NRZ) data format could also be implemented.

Pulses 41 and 42 are applied to FP filter 13, which has characteristic waveform 43 shown in FIG. 4B. The optical power at the output of the FP filter, $P_{OUT}$, is a function of the input power, $P_{IN, RX}$ and the transmission intensity curve $T(\lambda)$ of FIG. 4B, where:

$$P_{OUT}=T(\lambda)P_{IN, RX};$$

$$P_{IN, RX}=a P_{IN, LINK};$$

where a=attenuation factor of the fiber optic cable (LINK).

Figure 4C:
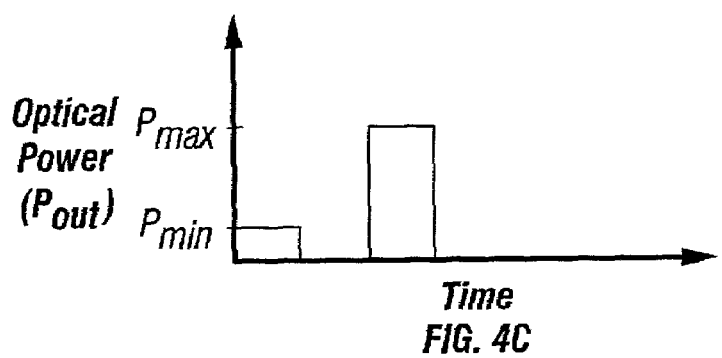

Substituting values for $\lambda_0$ and $\lambda_1$ into $T(\lambda)$ yields $P_{min}$ and $P_{max}$ as in FIG. 4C, represented as follows:

$$P_{min}=T(\lambda_0)P_{IN, RX}=T_{min}P_{IN, RX};$$

$$P_{max}=T(\lambda_1)P_{IN, RX}=T_{max}P_{IN, RX}.$$

Figure 4D:
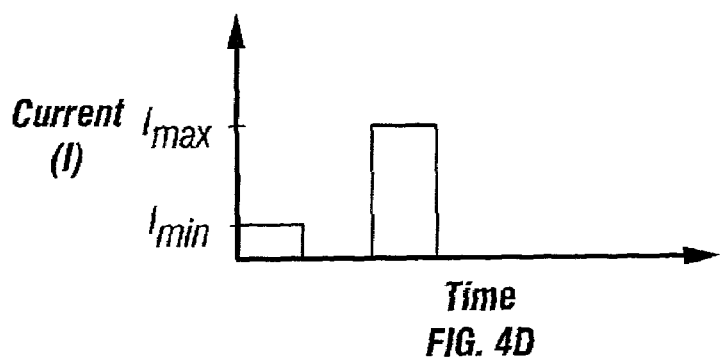

The optical signals out of the filter are converted to electrical signals by photodetector 14. The photodetector converts the optical power to minimum and maximum currents, $I_{min}$ and $I_{max}$, as illustrated in FIG. 4D, and according to the following equations:

$$I_{min}=\mathcal{R} P_{min};$$

$$I_{max}=\mathcal{R} P_{max}.$$

where I=current out of photodetector;
$\mathcal{R}$=responsivity of the photodetector; and
P=optical power.

Figure 5C:
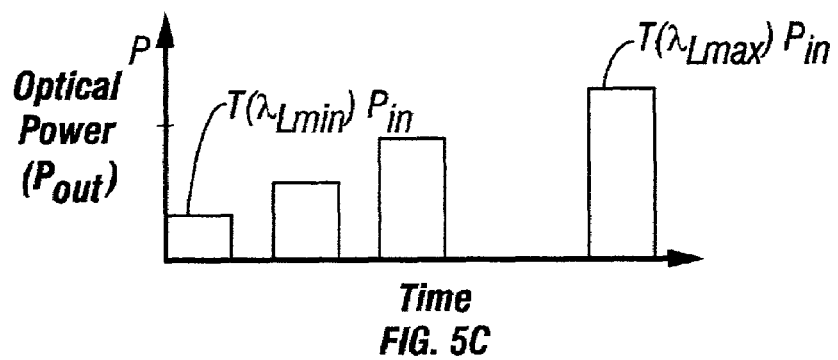
Figure 5D:
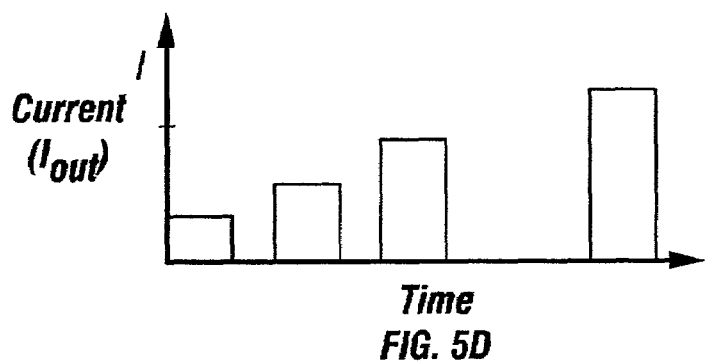
Figure 6:
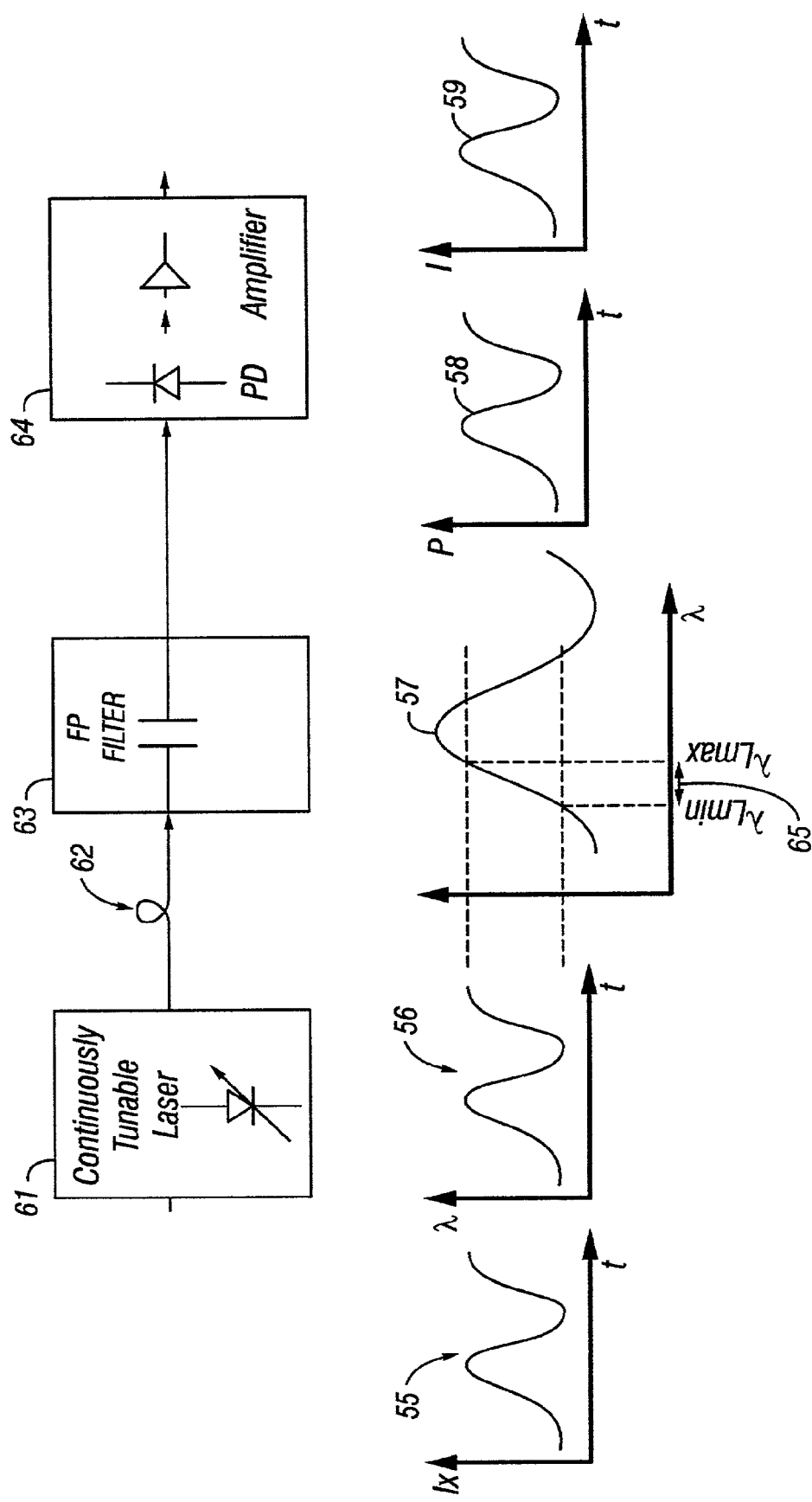
FIG. 6 is a diagram of an embodiment of the invention where the optical signal contains analog information, and showing representative waveforms at various locations.

FIG. 5B is a graph of optical transmission intensity vs. wavelength, $T(\lambda)$, similar to FIGS. 2 and 4B. This figure displays use of the linear portion of the graph for converting multiple wavelengths to intensities. Thus, the same FP filter can be used in a system where multiple wavelengths are used to transmit encoded data as illustrated by FIGS. 5A through 5D (multilevel modulation format), the description of which closely follows that of FIGS. 4A through 4D. The minimum and maximum wavelengths of the linear portion of FIG. 5B are represented by $\lambda_{Lmin}$ and $\lambda_{Lmax}$ respectively. The wavelength difference between successive signals used to send data is represented by $\Delta\lambda$, in FIG. 5A. In theory, $\Delta\lambda$ could be infinitely small, which is desired for the embodiment of the invention comprising analog data as shown in FIG. 6. Therefore, all wavelengths within the range $\lambda_{Lmin}$ to $\lambda_{Lmax}$ are available to be mapped from all the amplitude variations that exist in an analog signal (see FIG. 6). "Mapping" may also be described as assigning corresponding values similar to a mathematical function.

As before, the pulses shown in FIG. 5A are applied to the FP filter, which has the characteristic waveform of FIG. 5B. FIG. 5C shows the corresponding optical power out of the filter, which is applied to the photodetector. The corresponding electrical signals from the photodetector are shown in FIG. 5D.

Using wavelengths within the linear portion of the FP filter provides a one-to-one correspondence between wavelength and amplitude of the signal out of the photodetector. Normally, a FP filter is designed to have sharp peaks (resonances) centered around a particular wavelength of interest. However, the FP filter used in the present invention is custom designed so that peaks and valleys of the transmission plot are more gradual and a near one-to-one correspondence is achieved. As a result, the output intensity of the FP filter is most responsive to changes in wavelength and no two wavelengths will result in the same intensity for the range of wavelengths of interest.

In addition to discrete data levels (digital or multilevel), the invention is useful for optical transmission of analog modulated data. In this configuration, the invention could be described as similar to an AM signal converted to an FM signal for transmission and subsequently converted back to an AM signal in order to be decoded at the receiver.

In accordance with FIG. 6, AM data provides control signal 55 to tune (select wavelength) a linear, continuously tunable laser 61. The input signal to laser 61 is shown as curve 55 as a plot of signal Intensity Ix versus time. Hence, laser 61 is designed to be tuned according to changes in amplitude of an input control signal. The laser converts the AM data to FM data 56 where the frequency is alternatively the wavelength of the light rather than an electrical subcarrier frequency as is often done in the electrical domain. Signal 56 is plotted as wavelength versus time. After transmission through fiber optic link 62, the optical signal passes through FP filter 63 designed to operate over the wavelengths of the tunable laser, its characteristic waveform being shown as curve 57. The FP filter should be designed to have a linear optical transmission intensity versus incoming wavelength (as in FIG. 5B). The FM data is then converted back to AM data since the intensity of the light at the output of the FP filter will be directly proportional to the wavelength of light. This is represented by curve 58 in a plot of power or intensity versus time. After passing through the FP filter, the light is detected by a photodetector, amplified, and offset to achieve the appropriate voltage levels. The current out of the photodetector is represented in curve 59. Receiver 64, which includes the photodetector, amplifiers, and offset circuitry, should also be linear over the range of incoming optical signal levels. Note that a decision circuit is not included in the receiver for a system transmitting analog data. In order to maximize the signal quality, the tunable laser and FP filter should be designed to utilize the same wavelength range, and the linear portion of the transmission intensity versus wavelength characteristic should be fully utilized. The photodetector may be any suitable device which is responsive to light intensities to provide a useful output, as one skilled in this technical field might decide to use.

The terms "coded" and "decoded" as used herein are generally taken to mean the same as modulated and demodulated.

While the invention has been illustrated and described by means of specific embodiments, it is to be understood that numerous changes and modifications may be made therein without departing from the intent and scope of the invention as defined in the appended claims and equivalents thereto.

What is claimed is:

1. A wavelength-sensitive receiver used in fiber optic transmission systems, the receiver comprising:
    means for receiving input optical signals having different wavelengths;
    a converter for converting said different wavelength input optical signals to signals having intensities corresponding to the wavelengths of the input optical signals; and
    a detector to convert the optical signals to electrical signals based on the respective signal intensities, which result from the input signals of said different wavelengths.

2. The receiver recited in claim 1, wherein said converter comprises a Fabry-Perot (FP) filter.

3. The receiver recited in claim 2, wherein said FP filter comprises a maximum and minimum transmission intensity versus input wavelength characteristic that is utilized to convert said input signals to said corresponding signal intensities.

4. The receiver recited in claim 2, wherein said FP filter comprises a transmission intensity versus input wavelength characteristic that provides a one-to-one correspondence between said transmission intensity and said input wavelength that is utilized to convert said input signals to said corresponding signal intensities.

5. An optical transmission system for transmitting and receiving optical signals while achieving reduced sensitivity to attenuation losses, the system comprising:
    a means for receiving input data that is coded based on amplitude;
    a tunable laser to map said input data to a plurality of signals having different wavelengths;
    an optical converter to convert said plurality of signals of different wavelengths to a plurality of signals having intensities corresponding to the different wavelengths;
    a detector to convert the optical signals to electrical signals based on said plurality of intensities; and
    recovery means to decode said electrical signal and present it in the original form of said input data.

6. The optical transmission system recited in claim 5, wherein said optical converter comprises a Fabry Perot (FP) filter.

7. The optical transmission system recited in claim 5, wherein said input data is in digital data format.

8. The optical transmission system recited in claim 5, wherein said input data is in multilevel data format.

9. The optical transmission system recited in claim 5, wherein said tunable laser is a continuously tunable laser.

10. The optical transmission system recited in claim 5, wherein said tunable laser is a multi-wavelength laser.

11. The optical transmission system recited in claim 5, wherein said recovery means comprises a decision circuit.

12. The optical transmission system recited in claim 5, wherein said input data is in analog data format.

13. The optical transmission system recited in claim 5, wherein said tunable laser is a linear, continuously tunable laser.

14. The optical transmission system recited in claim 5, wherein said detector is a photodetector.

15. A method for transmitting and receiving optical signals so as to reduce the effect of signal attenuation losses, the method comprising:
    mapping data that is amplitude modulated to a plurality of signals having different wavelengths based on the different amplitudes of the signals;
    converting the optical signals to optical intensity signals based on the signal wavelength at a particular time; and
    converting the optical signals to electrical signals using a detector.

16. The method recited in claim 15, wherein said data that is amplitude modulated is also in digital format.

17. The method recited in claim 15, wherein said data that is amplitude modulated is also in analog format.

18. The method recited in claim 15, wherein said data that is amplitude modulated is also in multilevel modulation format.

19. The method recited in claim 15, and further comprising decoding the electrical signals to the original signal format.

20. A method for transmitting and receiving optical signals so as to reduce the effect of signal attenuation losses, the optical signals being coded based on amplitude, the method comprising:
    converting the amplitude coded signals to wavelength coded signals before the signals are transmitted over an optical link;
    converting the wavelength coded signals to optical intensity coded signals based on signal wavelength after transmission through an optical link; and
    converting the optical intensity coded signals to electrical signals in the format of the received optical signal.

21. The method recited in claim 20, wherein the wavelength to intensity conversion is accomplished by means of a Fabry-Perot (FP) filter having a predetermined transmission characteristic waveform of intensity in relation to wavelength.

22. The method recited in claim 21, wherein the input format is in digital optical format and the output of the FP filter is in digital intensity format.

23. The method recited in claim 21, wherein the output of the FP filter is dependent on the wavelength of the input signals and the transmission characteristic of the FP filter.

* * * * *